United States Patent [19]

Koishi et al.

[11] Patent Number: 5,258,447
[45] Date of Patent: Nov. 2, 1993

[54] FLUOROOLEFIN BASED COPOLYMER USEFUL IN ELECTRODEPOSITION PAINTS

[75] Inventors: Toshio Koishi, Sakado; Mikio Ootani; Toru Koshita, both of Kawagoe, all of Japan

[73] Assignee: Central Glass Company, Limited, Ube, Japan

[21] Appl. No.: 856,400

[22] Filed: Mar. 23, 1992

[30] Foreign Application Priority Data

Apr. 9, 1991 [JP] Japan ................................. 3-076377
Apr. 23, 1991 [JP] Japan ................................. 3-091838

[51] Int. Cl.$^5$ .............................................. C08K 27/12
[52] U.S. Cl. ..................................... 524/544; 524/546; 526/249; 526/250
[58] Field of Search ................. 524/544, 546; 526/249, 526/250

[56] References Cited

U.S. PATENT DOCUMENTS

| | | | |
|---|---|---|---|
| 4,631,326 | 12/1986 | Koishi et al. | 526/249 |
| 4,711,926 | 12/1987 | Kojima et al. | 524/512 |
| 4,842,940 | 6/1989 | Yoshimura et al. | 428/422 |
| 4,954,589 | 9/1990 | Sugawara et al. | 526/255 |

*Primary Examiner*—Joseph L. Schofer
*Assistant Examiner*—Peter D. Mulcahy
*Attorney, Agent, or Firm*—Keck, Mahin & Cate

[57] ABSTRACT

The invention provides a copolymer which comprises, as essential components, 25–75 mol % of a fluoroolefin such as CTFE, 10–70 mol % of a carboxylic acid vinyl ester, 3–75 mol % of a hydroxyl-containing allyl ether and 0.1–20 mol % of an unsaturated carboxylic acid having at least 6 carbon atoms in the molecule. The copolymer is soluble in various organic solvents and curable, e.g., with a blocked polyisocyanate or a modified melamine resin. The copolymer can be prepared by a suspension polymerization method in an aqueous medium and hence can be made very low in the contents of unreacted residual monomers. The copolymer is very suitable for use in electrodeposition paints.

12 Claims, No Drawings

FLUOROOLEFIN BASED COPOLYMER USEFUL IN ELECTRODEPOSITION PAINTS

BACKGROUND OF THE INVENTION

This invention relates to a multicomponent copolymer which uses a fluoroolefin and a carboxylic acid vinyl ester as the basic components and further incorporates a hydroxyl-containing allyl ether and an unsaturated carboxylic acid in order to possess both hydroxyl group and carboxyl group. The copolymer is soluble in various organic solvents, curable by using the hydroxyl group as a functional group and suitable for use in paints including electrodepositon paints.

Fluororesins are generally excellent in chemical resistance, weather resistance and heat resistance, and in view of these favorable properties the use of fluororesin based paints is increasing in various fields.

As a fluororesin suitable for solvent-thinned paints, U.S. Pat. No. 4,631,326 shows a copolymer of chlorotrifluoroethylene with a carboxylic acid vinyl ester such as vinyl acetate and a hydroxyl-containing allyl ether such as ethylene glycol monoallyl ether. This copolymer is soluble in various organic solvents and curable with a conventional curing agent which reacts with hydroxyl group. The patent specification contains an example of preparing this copolymer by a suspension polymerization method, but usually the copolymer is prepared by a solution polymerization method. U.S. Pat. No. 4,954,589 relates to an analogous copolymer and shows to introduce carboxyl group into the copolymer by using an acid such as acrylic acid or vinylacetic acid as an additional monomer with the purpose of improving the dispersibility of inorganic and organic pigments in a solution of the copolymer. Usually the carboxyl-containing copolymer is prepared by solution polymerization.

In preparing a copolymer for use in solvent-thinned paints it is favorable to employ a solution polymerization method to thereby obtain the copolymer in the form of solution. A problem inherent to solution polymerization is that some portions of the monomers charged in the reactor inevitably remain unreacted and exist in the obtained solution of the copolymer. The unreacted residual monomers include monomers having a functional group such as hydroxyl group or carboxylic group, and when the copolymer solution is used in a paint composition the properties of the paint film are adversely affected by the reaction of the functional groups of the residual monomers with a curing agent.

Recently the application of electrodeposition painting is widening, and it has been developed to use fluororesins that are soluble in organic solvents in electrodeposition paints for vehicles or other articles to be used outdoors. For use in electrodeposition painting there is the need of preparing an acidified fluororesin. For example, U.S. Pat. No. 4,711,926 and U.S. Pat. No. 4,842,940 respectively show electrodeposition paints using fluoroolefin based copolymers having both hydroxyl group and carboxyl group. Either of these copolymers is prepared by a two-stage process: by first forming a copolymer having hydroxyl group but not having carboxyl group by solution polymerization and then converting a portion of the hydroxyl groups in the copolymer to carboxyl groups.

In electrodeposition painting, it is very undesirable that a resin used in the paint contains unreacted monomers having functional groups because such residual monomers are detrimental to the stability of the electrodeposition bath and adversely affect the curability and adhesibility of the paint film. To reduce the contents of unreacted residual monomers in a copolymer prepared by solution polymerization, the conventional method is distillation under reduced pressure. However, the monomers having hydroxyl group or carboxyl group having relatively high boiling points and hence cannot easily be decreased by distillation. Besides, to use a copolymer prepared by a solution polymerization method in an electrodeposition paint there is the need of completely distilling out the organic solvent used in the solution polymerization operation and then dissolving the dried copolymer in another organic solvent which is soluble in water.

SUMMARY OF THE INVENTION

It is an object of the present invention to provide a fluoroolefin based copolymer which has both hydroxyl group and carboxyl group, is useful in varnishes and paints including electrodeposition paints and can be prepared by a suspension polymerization method with very low contents of unreacted residual monomers.

According to the invention there is provided a copolymer comprising (i) 25 to 75 mol % of a fluoroolefin, (ii) 10 to 70 mol % of at least one carboxylic acid vinyl ester, (iii) 3 to 75 mol % of a hydroxyl-containing allyl ether selected from ethers represented by the formula (1), ethers represented by the formula (2) and the ether represented by the formula (3),

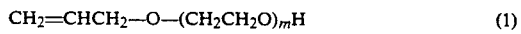

$$CH_2=CHCH_2-O-(CH_2CH_2O)_mH \qquad (1)$$

where m is an integer from 1 to 5,

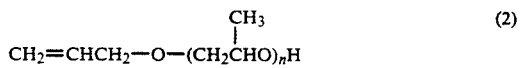

$$CH_2=CHCH_2-O-(CH_2\underset{|}{\overset{CH_3}{C}}HO)_nH \qquad (2)$$

where n is an integer from 1 to 5,

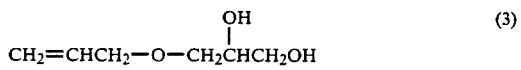

$$CH_2=CHCH_2-O-CH_2\underset{|}{\overset{OH}{C}}HCH_2OH \qquad (3)$$

and (iv) 0.1 to 20 mol % of an unsaturated carboxylic acid having at least 6 carbon atoms in the molecule.

Optionally, this copolymer may further comprise not more than 50 mol % of an alkyl vinyl ether.

According to the invention an unsaturated carboxylic acid having at least 6 carbon atoms in the molecule is used to introduce carboxyl group into a copolymer of a fluoroolefin, a carboxylic acid vinyl ester and a hydroxyl-containing allyl ether. We have discovered that by using such a carboxylic acid a desirably acidified copolymer can smoothly be prepared by a suspension polymerization method using water as the liquid medium. By suspension polymerization the copolymer is obtained as fine particles suspended in the aqueous liquid medium, and the copolymer separated from the liquid medium is very low in the contents of unreacted residual monomers.

The aforementioned U.S. Pat. No. 4,954,589 shows to use an unsaturated carboxylic acid having a relatively small number of carbon atoms, such as acrylic acid, methacrylic acid, vinylacetic acid or allyloxyacetic acid. These carboxylic acids are relatively high in solubility in water that is used for suspension polymerization. Therefore, when it is intended to prepare a copolymer according to U.S. Pat. No. 4,954,589 by suspension polymerization the carboxylic acid monomer does not efficiently copolymerize with the other monomers so that the obtained copolymer is low in acid value. Furthermore, both acrylic acid and methacrylic acid are conjugated compounds and hence do not readily copolymerize with fluoroolefins which are unconjugated compounds.

A copolymer according to the invention is soluble in various organic solvents including water-soluble solvents and curable with an ordinary curing agent such as a polyisocyanate or a modified melamine resin, and the cured copolymer is excellent in chemical resistance, weather resistance and abrasion or scratch resistance. A solution of the copolymer is useful as the base of a varnish or paint composition and provides a paint film which is strong in adhesion to the substrate. This copolymer can be used in an electrodeposition paint, and the obtained paint has an advantage that the electrodeposition bath exhibits very good stability since the copolymer is almost free from unreacted residual monomers.

DESCRIPTION OF THE PREFERRED EMBODIMENTS

Examples of fluoroolefins useful in this invention are trifluoroethylene, tetrafluoroethylene, chlorotrifluoroethylene, hexafluoropropylene, vinyl fluoride and vinylidene fluoride. In view of polymerizing reactivities, chlorotrifluoroethylene and tetrafluoroethylene are preferred.

In any case the fluoroolefin occupies 25-75 mol % of a copolymer according to the invention. If the amount of the fluoroolefin is too small the copolymer becomes insufficient in chemical resistance and weather resistance. If the amount of this component is too large the copolymer becomes low in solubilities in organic solvents, and it becomes difficult to prepare the copolymer at high yield. It is preferable that the fluoroolefin occupies 40-60 mol % of the copolymer.

The second component of the copolymer is a carboxylic acid vinyl ester or a combination of a plurality of kinds of carboxylic acid vinyl esters. A wide selection can be made from both aliphatic carboxylic acid vinyl esters and aromatic carboxylic acid vinyl esters. Examples of useful aliphatic esters are vinyl acetate, vinyl propionate, binyl butylate, vinyl isobutylate, vinyl caproate, vinyl isocaproate, vinyl pivalate, vinyl caprylate, vinyl caprate, vinyl stearate, and VEOVA-9 and VEOVA-10 which are tradenames of Showa-Shell Chem. Co. for vinyl esters of synthetic monocarboxylic acids having 9 and 10 carbon atoms, respectively. Both VEOVA-9 and VEOVA-10 have a branched structure represented by the formula (4):

wherein $R^1$, $R^2$ and $R^3$ are alkyl groups at least one of which is methyl group, and the total number of carbon atoms in the alkyl groups $R^1$, $R^2$ and $R^3$ is 7 or 8. Examples of useful aromatic esters are vinyl benzoate and vinyl p-tert-butyl benzoate.

In the copolymer the vinyl ester component must amount to 10-70 mol %. If the amount of this component is too small the copolymer will become too low in molecular weight, and the preparation of the copolymer will suffer from low yield. If the amount of this component is too large the copolymer becomes insufficient in chemical resistance and weather resistance. It is preferable that the vinyl ester component amounts to 20-50 mol % of the copolymer.

The third component is a hydroxyl-containing allyl ether, which is a compound represented by any of the formulas (1) to (3) indicated hereinbefore. In this regard there is a possibility of using a specific derivative of a hydroxyl-containing allyl ether represented by one of the formulas (1) to (3). Said derivative is obtained by modifying the —OH group(s) of the allyl ether with ε-caprolactone. In most cases it is convenient to use hydroxyl-containing allyl ethers are ethylene glycol monoallyl ether or propylene glycol monoallyl ether.

In the copolymer the hydroxyl-containing allyl ether needs to amount to 3-40 mol %. If the amount of this component is too small the copolymer does not readily undergo curing reaction with a curing agent so that the cured copolymer is insufficient in chemical resistance or weather resistance, and a paint composition using the copolymer becomes poor in recoatability. If the amount of this component is too large the copolymer will become too low in molecular weight, and some difficulties will arise in preparing the copolymer. It is preferred that the allyl ether component amounts to 5-30 mol % of the copolymer. From another aspect, in general it is suitable that the amount of the hydroxyl-containing allyl ether is such that the copolymer exhibits an OH-value ranging from 10 to 150 mg KOH/g, and preferably from 20 to 100 mg KOH/g.

The fourth component is an unsaturated carboxylic acid having at least 6 carbon atoms in the molecule. Examples of useful carboxylic acids are 2-hexenoic acid, 3-hexenoic acid, 5-hexenoic acid, 2-heptenoic acid, 3-heptenoic acid, 3-octenoic acid, 2-nonenoic acid, 3-nonenoic acid, 9-decenoic acid, 10-undecenoic acid, 2-dodecenoic acid and 2-tridecenoic acid. In view of polymerizing reactivities, it is preferable to use an unsaturated carboxylic acid having double bond at a terminal of the molecular chain, such as 5-hexenoic acid, 9-decenoic acid or 10-undecenoic acid.

The unsaturated carboxylic acid needs to amount to 0.1-20 mol % of the copolymer. If the amount of this component is less than 0.1 mol %, difficulty may arise in dispersing a pigment in a solution of the copolymer in an organic solution or mixing water in the solution. If the amount of this component is too large the copolymer becomes relatively low in water resistance and hence insufficient in weatherability. From another aspect, in general it is suitable that the acid-containing copolymer exhibits an acid value ranging from 5 to 100 mg KOH/g, and preferably from 10 to 70 mg KOH/g.

In addition to the above described essential components, an alkyl vinyl ether may optionally be incorporated in a copolymer according to the invention with the purpose of further enhancing the weatherability of the copolymer. The alkyl vinyl ether may have hydroxyl group. It is convenient to make a selection from ethyl vinyl ether, n-butyl vinyl ether, isobutyl vinyl ether, hydroxyethyl vinyl ether and hydroxybutyl vinyl ether since these compounds are relatively low in price and easy to handle, though it is permissible to employ a different vinyl ether such as methyl vinyl ether, 2-ethylhexyl vinyl ether or isooctyl vinyl ether. In the copolymer the amount of the alkyl vinyl ether should not exceed 50 mol %. The incorporation of a larger amount of alkyl vinyl ether is unfavorable for the polymerization operation, and the copolymer becomes inferior in some of the important properties. It is preferable that in the copolymer the amount of the alkyl vinyl ether is not more than 40 mol %.

As to the purity of monomers for use in this invention, gas chromatography purity of 98% or above is sufficient so long as impurities obstructive to usual radical polymerization reactions are not contained.

A copolymer according to the invention is prepared by a suspension polymerization process using water, or a mixture of water and a relatively small amount of a suitable organic solvent, as the liquid medium for the copolymerizing reaction. The copolymerization can be accomplished by using a commonly used radical polymerization initiator, and the copolymerization reaction is performed at temperatures ranging from about 5° C. to about 130° C. The reaction temperature is chosen according to the type of the employed initiator, but in general a preferred range of the reaction temperature is from 20° to 100° C. A suitable radical polymerization initiator can be selected from organic peroxides such as diisopropyl peroxydicarbonate, di-n-propyl peroxydicarbonate, tert-butyl peroxydicarbonate, di-2-ethylhexyl peroxydicarbonate, benzoyl peroxide, lauroyl peroxide, propionyl peroxide, trichloroacetyl peroxide, perfluorobutyryl peroxide and perfluorooctanoyl peroxide, and azo compounds such as azobisisobutyronitrile and azobis-2,4-dimethylvaleronitrile.

By the suspension polymerization process the aimed copolymer is formed as fine particles suspended in the aqueous medium. The fine particles of the copolymer is collected by filtration and well washed with water to dissolve out unreacted residues of the monomers.

A copolymer according to the invention is soluble in various organic solvents, which include cyclic ethers such as tetrahydrofuran and dioxane, aromatic hydrocarbons such as benzene, toluene and xylene, esters such as ethyl acetate and butyl acetate, ketones such as acetone, methylethyl ketone, methylisobutyl ketone and cyclohexanone, amides such as dimethylformamide and dimethylacetamide, halogen-containing solvents such as 1,1,1-trichloroethane and trichloroethylene, alcohols such as methanol, ethanol, isopropanol and tert-butanol and glycol ethers such as dimethyl carbitol, methyl cellosolve, ethyl cellosolve and butyl cellosolve.

A copolymer according to the invention has active hydrogen in the molecular chain and hence can be cured by cross-linking reaction with a compound having a functional group that reacts with active hydrogen. When a suitable polyisocyanate is used as a curing agent the curing proceeds even at room temperature. When a blocked polyisocyanate is used the curing reaction takes place by heating to a temperature above the dissociation temperature of the blocked polyisocyanate. It is also possible to use a melamine resin, urea resin, guanamine resin or a polybasic acid or its anhydride as a curing agent to cure the copolymer by heating.

In using a copolymer according to the invention in an electrodeposition paint composition, a curing agent is added to a solution of the copolymer in an organic solvent. In this case it is necessary to use an organic solvent that is soluble in water, and hence it is suitable to select the solvent from the above named alcohols and glycol ethers. As to the curing agent it is suitable use a blocked polyisocyanate such as, for example, blocked hexamethylenediisocyanate trimer, methyl etherified, methyl-and-butyl etherified or methyl-and-isobutyl etherified methylolmelamine resin, benzoguanamine resin or urea resin. In general, 5 to 100 parts by weight of curing agent is added per 100 parts by weight of the copolymer in the solution.

In the solution for preparing an electrodeposition paint composition it is necessary to neutralize at least a portion of the carboxyl groups of the dissolved copolymer. Therefore, a basic compound is added to the solution before introducing other additives. The basic compound can be selected from ammonia, primary, secondary and tertiary amines such as monoethylamine, diethylamine, triethylamine and trimethylamine, alkanolamines such as diethanolamine, triethanolamine and diisopropanolamine, alkylene polyamines such as ethylenediamine and propylenediamine and nitrogen-containing cyclic compounds such as pyridine and piperidine.

After the neutralizing treatment, a selected curing agent is added to the solution of the copolymer. Besides, according to the need conventional additives for paint compositions are selectively added to the solution. For example, the optional additives are selected from conventional pigments, ultraviolet absorbing agents, light stabilizers, antioxidants, leveling agents, delustering agents, etc. Any of these additives exhibits good dispersibility in a solution of the copolymer of the invention. After that a suitable amount of water is gradually added to the solution while stirring the solution. In the thus prepared electrodeposition paint liquid composition the total concentration of the fluorine-containing copolymer and additives is adjusted usually to 3-25 wt %, and preferably to 5-20 wt %.

As an ultraviolet absorbing agent for an electrodeposition paint composition according to the invention, it is suitable to use a benzophenone compound such as 2-hydroxy-4-methoxybenzophenone or 2-hydroxy-4-n-octoxybenzophenone, a benzotriazole compound such as 2-(2'-hydroxy-5'-methylphenyl)benzotriazole, 2-(2'-hydroxy-5'-tert-octylphenyl)benzotriazole or 2-(2'-hydroxy-3',5'-di-tert-amylphenyl)benzotriazole or an acrylate such as ethyl-2-cyano-3,3-diphenyl acrylate. A suitable amount of the ultraviolet absorbing agent is 0.2-15 parts by weight per 100 parts by weight of the fluorine-containing copolymer. As a light stabilizer it is suitable to use a hindered amine, and a suitable amount of the light stabilizer is 0.1-5 parts by weight per 100 parts by weight of the copolymer.

An electrodeposition paint according to the invention is applicable to metals such as, for example, iron, copper, aluminum and titanium, and their alloys, and metal plated plastic articles. To perform electrodeposition painting, the object of painting is immersed in the electrodeposition paint liquid as the anode, and usually a DC voltage of 50-280 V is applied between the anode and a suitable cathode for 10-250 sec. After washing the painted article with water the paint film is cured by heating, for example, at a temperature ranging from 140°-250° C. for about 5-30 min. The heat cured paint film is a sufficiently hard film.

The following examples are illustrative of the invention, but these examples are not limitative.

EXAMPLE 1

A 1-liter stainless steel autoclave provided with an electromagnetic stirre was charged with 46.1 g of vinyl pivalate (VPv), 33.2 g of VEOVA-9 (V-9), 25.7 g of ethylene glycol monoallyl ether (EGMAE), 19.9 g of 10-undecenoic acid (UdA), 0.46 g of sodium carbonate which was employed as an acid acceptor, 0.46 g of methyl cellulose which was employed as a suspending agent, 2.30 g of a commercial polymerization initiator (PERLOYL L of Nippon Oil & Fats Co., a peroxide) and 180 g of water. The gas atmosphere in the autoclave was replaced by nitrogen gas, and this operation was repeated twice. After that the nitrogen gas was purged from the autoclave, and 104.8 g of chlorotrifluoroethylene (CTFE) was introduced into the autoclave while the autoclave was cooled in iced water. Then the temperature in the autoclave was gradually raised up to 60° C., and at this temperature radical polymerization reaction was carried out for 24 hr. After that unreacted CTFE was discharged from the autoclave, and the autoclave was opened. The reaction liquid in the autoclave was almost free of scale and contained a copolymer in the form of fine particles. The fine particles of the copolymer were collected by filtration, washed with water and dried under reduced pressure at about 40° C. for about 24 hr. The dry weight of the obtained copolymer was 170 g, which means 74% yield.

The obtained copolymer had a number average molecular weight of about 23000 (determined by assuming the copolymer to be polystyrene), and the copolymer had an OH value of 50 mg KOH/g (measured by the acetylation method using acetic anhydride) and an acid value of 32 mg KOH/g (measured by the method of JIS K 5400).

A portion of the obtained copolymer was dissolved in butyl acetate to prepare a 50 wt % solution of the copolymer. The solution was refined by filtration. Using this solution the amounts of unreacted residual monomers were analyzed by gas chromatography mainly with respect to the hydroxyl-containing allyl ether (EGMAE in this example) and the unsaturated carboxylic acid (UdA in this example). As described hereinbefore, the existence of these monomers in the copolymer is unfavorable for the use of the copolymer in electrodeposition paints. In this copolymer the content of unreacted residual EGMAE was only 0.02 wt % and the content of unreacted residual UdA was only 0.01 wt %.

EXAMPLES 2-7

In these examples the copolymerization process of Example 1 was repeated with selective changes in the kind and quantity of monomers. The particulars are shown in Table 1. In Example 7 the fluoroolefin was changed to tetrafluoroethylene (TFE). As to vinyl esters, vinyl acetate (VAc) was used in Example 2, and vinyl caproate (VCa) was used in Examples 3 and 5 in place of V-9 or VPv in Example 1. As to hydroxyl-containing allyl ether, propylene glycol monoallyl ether (PGMAE) was used in Examples 3 and 6. Besides, in Example 6 hydroxylbutyl vinyl ether (HBVE) was used as an optional monomer. As to unsaturated carboxylic acid, 9-decenoic acid (DeA) was used in Example 3. In every example the the quantity of the radical polymerization initiator was 0.5 wt % of the total of the charged monomers.

In any of Examples 2-7 the reaction product was a copolymer in the form of fine particles. Table 2 shows the properties of the copolymers obtained in Examples 1-7 and the amounts of unreacted residual ethers and carboxylic acids in the respective copolymers in the form of solution in butyl acetate.

TABLE 1

| | Copolymerization | | | | | | | | |
|---|---|---|---|---|---|---|---|---|---|
| | Ex. 1 | Ex. 2 | Ex. 3 | Ex. 4 | Ex. 5 | Ex. 6 | Ex. 7 | Comp. Ex. 1 | Comp. Ex. 2 |
| Charged Monomers (g) | | | | | | | | | |
| CTFE | 104.8 | 104.8 | 104.8 | 115.3 | 110.1 | 104.8 | | 104.8 | 104.8 |
| TFE | | | | | | | 90.0 | | |
| VAc | | 46.4 | | | | | | | |
| VPv | 46.1 | | 46.1 | 80.7 | | 46.1 | 80.7 | 46.1 | 46.1 |
| VCa | | | 25.6 | | 41.6 | | | | 25.6 |
| V-9 | 33.2 | | | | 53.9 | 33.2 | | 33.2 | |
| EGMAE | 25.7 | 25.7 | | 9.2 | 18.4 | | 9.2 | 25.7 | 25.7 |
| PGMAE | | | 30.5 | | | 22.0 | | | |
| HBVE | | | | | | 4.2 | | | |
| DeA | | | 18.4 | | | | | | |
| UdA | 19.9 | 19.9 | | 16.6 | 16.6 | 19.9 | 16.6 | | 19.9 |
| VAA | | | | | | | | 9.3 | |
| Total Copolymer | 229.7 | 196.8 | 225.4 | 221.8 | 240.6 | 230.2 | 196.5 | 219.1 | 222.1 |
| Weight (g) | 170 | 134 | 169 | 173 | 192 | 175 | 147 | 138 | 180 |
| Yield (%) | 74 | 68 | 75 | 78 | 80 | 76 | 75 | 63 | 81 |

TABLE 2

| | Copolymers | | | | | | | | |
|---|---|---|---|---|---|---|---|---|---|
| | Ex. 1 | Ex. 2 | Ex. 3 | Ex. 4 | Ex. 5 | Ex. 6 | Ex. 7 | Comp. Ex. 1 | Comp. Ex. 2 |
| Acid Value (mg KOH/g) | 32 | 35 | 30 | 31 | 30 | 36 | 33 | 7 | 66 |
| OH Value (mg KOH/g) | 50 | 52 | 63 | 27 | 36 | 55 | 25 | 52 | 72 |
| $M_n$ ($\times 10^4$) | 2.3 | 2.5 | 1.9 | 2.4 | 2.2 | 2.4 | 2.4 | 2.0 | 1.5 |
| $M_w$ ($\times 10^4$) | 3.9 | 4.2 | 3.5 | 4.1 | 3.9 | 4.5 | 4.2 | 3.7 | 3.0 |
| Residual Monomers (wt %) | | | | | | | | | |
| EGMAE | 0.02 | 0.01 | | 0.01 | 0.01 | | 0.01 | 0.02 | 0.59 |
| PGMAE | | | 0.03 | | | 0.03 | | | |

TABLE 2-continued

|  | Copolymers | | | | | | | | |
| --- | --- | --- | --- | --- | --- | --- | --- | --- | --- |
|  | Ex. 1 | Ex. 2 | Ex. 3 | Ex. 4 | Ex. 5 | Ex. 6 | Ex. 7 | Comp. Ex. 1 | Comp. Ex. 2 |
| HBVE |  |  |  |  |  |  | trace |  |  |
| DeA |  |  | 0.02 |  |  |  |  |  |  |
| UdA | 0.01 | 0.01 |  | 0.01 | 0.01 | 0.01 | 0.01 |  | 0.47 |
| VAA |  |  |  |  |  |  |  | 0.01 |  |

COMPARATIVE EXAMPLE 1

As the sole difference from Example 1, vinylacetic acid (VAA), which has 4 carbon atoms in the molecule, was used in place of UdA in Example 1. The proportions of the monomers are shown in Table 1.

In this case too the product of the suspension polymerization operation was a copolymer in the form of fine particles. However, analysis of the copolymer proved that the acid, VAA, had scarcely copolymerized with the other monomers. That is, the polymerization operation failed to give the aimed carboxyl-containing copolymer.

COMPARATIVE EXAMPLE 2

As shown in Table 1, the monomers copolymerized in this comparative example were the same as in Example 3 except that PGMAE was replaced by EGMAE which was used in Example 1. This comparative example relates to copolymerization of these monomers by solution polymerization.

A 1-liter stainless steel autoclave provided with an electromagnetic stirrer was charged with VPv, VCa, EGMAE and UdA together with 133 g of butyl acetate (solvent), 0.67 g of sodium carbonate (acid acceptor) and 1.59 g of a commercial polymerization intiator (PERBUTYL PV of Nippoon Oil & Fats Co.). The gas atmosphere in the autoclave was replaced by nitrogen gas, and this operation was repeated twice. Then the nitrogen gas was purged from the autoclave, and CTFE was introduced into the autoclave. The polymerization reaction was carried out at 55° C. for 24 hr. After that unreacted CTFE was discharged from the autoclave, and the autoclave was opened. The reaction liquid, which was a solution of a copolymer, was concentrated to a concentration of about 70 wt % to precipitate and separate unreacted monomers. After that the concentration of the solution was adjusted to 50 wt % by adding butyl acetate, and the solution was refined by filtration. The obtained solution was a clear liquid. The properties of the dissolved copolymer and the amounts of unreacted residual EGMAE and UdA in the copolyer were as shown in Table 2. Compared with the copolymers obtained in Examples 1 and 3 by suspension polymerization, the copolymer of Comparative Example 2 contained very larger amounts of unreacted ether and acid.

EVALUATION TESTS

Electrodeposition paint liqud compositions were prepared by selectively using the copolymers of Examples 1, 3, 4 and 5 and Comparative Examples 1 and 2.

Each of the copolymers of Examples 1, 3, 4 and 5 and Comparative Example 1 was dissolved in isopropanol to obtain a 50 wt % solution. In the case of the copolymer of Comparative Example 2, a powder of the copolymer was obtained by the steps of concentrating the solution obtained by the solution polymerization operation to about 70 wt %, drying the concentrated solution to completely dissipate the solvent and pulverizing the dry copolymer, and the obtained powder was dissolved in isopropanol to obtain a 50 wt % solution.

In a reaction vessel provided with a stirrer, 100 parts by weight of each copolymer solution was mixed with 21 parts by weight of a curing agent, which was a methyl-and-butyl etherified methylolmelamine resin (NIKA-LAC MX-40 of Sanwa Chemicals Co.). Stirring the mixture, triethylamine was gradually added until the degree of neutralization of the acidic copolymer in the solution reached about 60%. After that deionized water was added to the solution so as to obtain a paint liquid in which the total concentration of the copolymer and curing agent was 8 wt %. In the case of using the copolymer of Comparative Example 1 the addition of deionized water resulted in the formation of a large amount of precipitate, and hence it was necessary to remove the precipitate by filtration. For this reason, in the paint liquid using the copolymer of Comparative Example 1 the total concentration of the copolymer and curing agent was 2 wt %.

Each of the thus prepared paint liquids was used for electrodeposition painting of an aluminum plate, which was anodized in advance (8 μm in the thickness of the anodized surface layer). In an ordinary electrodeposition tank the aluminum plate was immersed in the paint liquid as the anode. The bath temperature was maintained at 20° C., and a DC voltage of 180 V was applied between the aluminum anode and the cathode to thereby accomplish electrodeposition painting. After that the aluminum plate was well washed with water and baked at 180° C. for about 20 min to cure the paint film.

The cured paint film was subjected to measurements of the characteristics shown in Table 3.

The specular gloss (incident angle 60°) was measured by the method according to JIS K 5400.

The adhesion strength was tested by the cross-cut adhesion test according to JIS K 5400, and the result is indicated by the number of no peel areas among 100 areas tested with cellophane tape.

The smoothness of surface was judged by observing the paint film surface with the naked eye. In Table 3 "A" means an evenly and sufficiently smooth film surface; "B" means appearance of local undulations in the film surface; and "C" means a rugged film surface.

The pencil hardness was tested by the scratching test method according to JIS K 5400, and the result is indicated by the maximum hardness of pencil that failed to give scratches.

Weatherability was tested by accelerated testing with a sunshine weathermeter for 4000 hr, and the surface gloss of each sample film was measured before and after the weathering test to indicate the degree of weatherability by percentage of the retained gloss.

TABLE 3

| | Paint Films | | | | | |
|---|---|---|---|---|---|---|
| Copolymer | Ex. 1 | Ex. 3 | Ex. 4 | Ex. 5 | Comp. Ex. 1 | Comp. Ex. 1 |
| Thickness (μm) | 10 | 12 | 8 | 10 | 2 | 15 |
| Smoothness | A | A | A | A | C | B |
| Specular Gloss (%) | 89 | 88 | 86 | 90 | 88 | 91 |
| Adhesion (no peel areas) | 100/100 | 100/100 | 100/100 | 100/100 | 100/100 | 100/100 |
| Pencil Hardness | 2H | 2H | 3H | H | 2H | 2H |
| Weatherability [gloss retained after accelerated weathering (%)] | 80 | 83 | 85 | 75 | 80 | 68 |

Furthermore, the storability of each paint liquid at room temperature was evaluated by examining whether the paint liquid changes in pH value or in color and whether any precipitate appears or not. The results are shown in Table 4, wherein "initially" means immediately after preparing the paint liquid. As to the color, every paint liquid had a milk-white color, but the paint liquid using the copolymer of Comparative Example 2 became brownish.

TABLE 4

| | Paint Liquids | | | | | |
|---|---|---|---|---|---|---|
| Copolymer | Ex. 1 | Ex. 3 | Ex. 4 | Ex. 5 | Comp. Ex. 1 | Comp. Ex. 2 |
| pH | | | | | | |
| initially | 8.2 | 8.3 | 8.2 | 8.0 | 8.1 | 8.2 |
| after 50 days | 8.4 | 8.3 | 8.4 | 8.3 | 8.2 | 6.5 |
| Change in Color in 50 days | no | no | no | no | no | yes |
| Precipitation in 50 days | no | no | no | no | no | yes |

What is claimed is:

1. A method of preparing a copolymer comprising,
   25 to 75 mol % of fluoroolefin;
   10 to 70 mol % of at least one carboxylic acid vinyl ester;
   3 to 75 mol % of a hydroxyl-containing allyl ether selected from ethers represented by the formula (1), ethers represented by the formula (2) and the ether represented by the formula (3), $$CH_2=CHCH_2-O-(CH_2CH_2O)_mH \quad (1)$$

where m is an integer from 1 to 5,

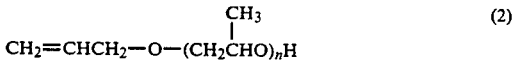
   (2)

where n is an integer from 1 to 5,

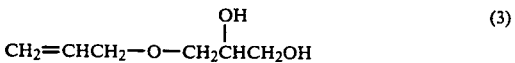
   (3)

and
   0.1 to 20 mol % of an unsaturated carboxylic acid having at least 6 carbon atoms in the molecule,
   said method comprising the steps of:
   reacting said fluoroolefin with said at least one carboxylic acid vinyl ester, said hydroxyl-containing allyl ether and said unsaturated carboxylic acid in an aqueous medium in the presence of a radical polymerization initiator, thereby forming a copolymer, and
   obtaining said copolymer in the form of particles suspended in said aqueous medium.

2. The method of claim 1, wherein the copolymer further comprises not more than 50 mol % of an alkyl vinyl ether.

3. The method of claim 2, wherein said alkyl vinyl ether is selected from the group consisting of ethyl vinyl ether, n-butyl vinyl ether isobutyl vinyl ether, hydroxyethyl vinyl ether and hydroxybutyl vinyl ether.

4. The method of claim 1, wherein said first, second, third and fourth repeating units amount to 40–60 mol %, 20–50 mol %, 5–30 mol % and 0.3–10 mol %, respectively.

5. The method of claim 1, wherein said fluoroolefin is selected from the group consisting of chlorotrifluoroethylene and tetrafluoroethylene.

6. The method of claim 1, wherein said carboxylic acid vinyl ester is selected from the group consisting of vinyl acetate, vinyl propionate, vinyl butyrate, vinyl isobutyrate, vinyl caproate, vinyl isocaproate, vinyl pivalate, vinyl caprylate, vinyl caprate, vinyl stearate and vinyl esters represented by the formula (4),

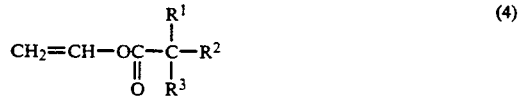
(4)

wherein $R^1$, $R^2$ and $R^3$ are alkyl groups, at least one of which is methyl group, and the total number of carbon atoms in the alkyl groups $R^1$, $R^2$ and $R^3$ is 7 or 8.

7. The method of claim 1, wherein said unsaturated carboxylic acid is selected from the group consisting of 2-hexenoic acid, 3-hexenoic acid, 5-hexenoic acid, 2-heptenoic acid, 3-heptenoic acid, 3-octenoic acid, 2-nonenoic acid, 3-nonenoic acid, 9-decenoic acid, 10-undecenoic acid, 2-dodencenoic acid and 2-tridecenoic acid.

8. The method of claim 1, wherein said unsaturated carboxylic acid is selected from the group consisting of 5-hexenoic acid, 9-decenoic acid and 10-undecenoic acid.

9. The method of claim 1, wherein the polymerizing reaction is carried out at a temperature in the range from about 5° C. to about 130° C.

10. The method of claim 9, wherein said temperature is in the range from about 20° C. to about 100° C.

11. The method of claim 1, wherein said radical polymerization initiator is an organic peroxide.

12. The method of claim 1, wherein said radical polymerization initiator is an azo compound.

* * * * *